(12) United States Patent
Oja

(10) Patent No.: US 7,743,870 B2
(45) Date of Patent: Jun. 29, 2010

(54) CRANE

(75) Inventor: Hannu Oja, Hyvinkää (FI)

(73) Assignee: KCI Konecranes PLC, Hyvinkaa (FI)

( * ) Notice: Subject to any disclaimer, the term of this patent is extended or adjusted under 35 U.S.C. 154(b) by 910 days.

(21) Appl. No.: 11/527,671

(22) Filed: Sep. 27, 2006

(65) Prior Publication Data

US 2007/0108150 A1 May 17, 2007

(30) Foreign Application Priority Data

Sep. 28, 2005 (FI) ................................. 20055517

(51) Int. Cl.
*B66C 9/04* (2006.01)
(52) U.S. Cl. ...................... 180/253; 414/460
(58) Field of Classification Search ................ 180/253, 180/236; 414/460, 293; 74/484 R
See application file for complete search history.

(56) References Cited

U.S. PATENT DOCUMENTS

| | | | | |
|---|---|---|---|---|
| 3,655,081 A | * | 4/1972 | Monk | 414/460 |
| 3,800,899 A | * | 4/1974 | Thwaites | 180/237 |
| 4,200,162 A | * | 4/1980 | Tax | 180/23 |
| 4,432,690 A | * | 2/1984 | Monk | 414/460 |
| 4,880,124 A | | 11/1989 | Feider et al. | |
| 5,735,416 A | * | 4/1998 | Jussila | 212/344 |
| 5,967,348 A | * | 10/1999 | Jussila | 212/344 |
| 6,206,127 B1 | * | 3/2001 | Zakula et al. | 180/236 |
| 6,564,955 B2 | * | 5/2003 | Franzen et al. | 212/301 |
| 6,796,572 B1 | * | 9/2004 | McGhie | 280/426 |
| 2001/0020558 A1 | * | 9/2001 | Franzen et al. | 180/418 |

FOREIGN PATENT DOCUMENTS

| | | |
|---|---|---|
| DE | 100 27 083 B4 | 1/2002 |
| FI | 943400 B | 1/1996 |
| JP | 2001-213587 A | 8/2001 |
| JP | 2002-137887 A | 5/2002 |

* cited by examiner

*Primary Examiner*—Charles A Fox
(74) *Attorney, Agent, or Firm*—Muncy, Geissler, Olds & Lowe, PLLC

(57) ABSTRACT

The invention relates to a crane comprising bogie structures (3) in the corners of the crane, a tandem drive wheel and idle wheel (8, 9) arranged in each bogie structure and provided to turn in the bogie structure offset from their vertical axes, and a turning device arrangement (15, 16) provided between each wheel pair for turning the wheel pair in cooperation to a selected position, the turning device arrangement comprising at least two turning rods (15, 16) connecting the wheels, which turning rods are connected to counterparts (17, 18, 19, 20) provided for each turning position or function in load-bearing structures (10, 11) of the wheels (8, 9) and turning along therewith, whereby at one wheel the position of the turning rods or the counterparts in the load-bearing structure is slidable around the load-bearing structure, yet the one of the counterparts or turning rods that corresponds to the selected turning position may be locked with a locking mechanism (21, 22, 23, 24) immobile with respect to the load-bearing structure for enabling wheel turning.

5 Claims, 3 Drawing Sheets

CRANE

BACKGROUND OF THE INVENTION

Figure 1:
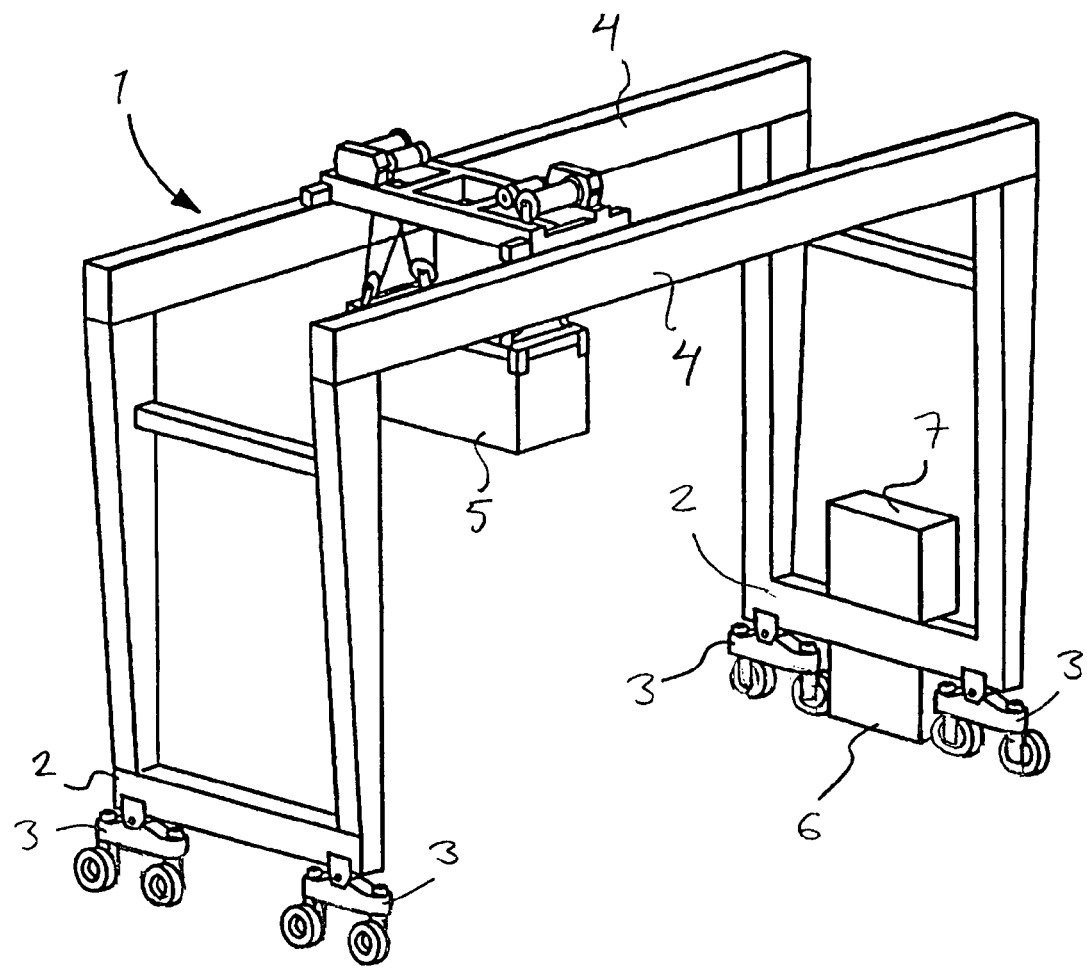

The invention relates to turning tandem bogie wheels of a rubber-tyred crane by means of one drive mechanism. More precisely, the invention relates to a crane comprising bogie structures in the corners of the crane, two wheels arranged in tandem in each bogie structure, the wheels being arranged in the bogie structure to be turnable about the vertical axis, the wheels being offset from the vertical axis, one wheel being a drive wheel and the other an idle wheel, a mechanism that drives and turns each drive wheel, and a turning device arrangement provided between each wheel pair for turning the wheel pair in co-operation to a selected position.

A gantry crane type that is generally used in container freight terminals is a powered rubber-tyred gantry (RTG) crane. Cranes come in a variety of types and sizes; generally, the classification is based on the number of wheels in the crane, i.e. 4-, 8- or 16-wheeled cranes. The crane has various operating modes, i.e. directions of movement: normal, lateral and circling. In the normal, common operating mode, the crane wheels are perpendicular to the driving direction of the hoist carriage of the crane. This mode enables the crane to move in the direction of a container stack. In the lateral mode the crane wheels are turned to be in parallel with the driving direction of the hoist carriage, and consequently it is possible to move the crane between the container stacks. In the circling mode the crane wheels are turned tangentially to the crane's centre (radius of turn). In this mode it is possible to rotate the crane horizontally about its central axis.

There are various wheel turning arrangements and two basic principles apply in the most commonly used ones. In the arrangement in accordance with the first basic principle, crane wheels are turned with a separate turning mechanism, typically a hydraulic cylinder or a separate turning apparatus. The wheels are placed in a centralized manner with respect to the radius of turn and the wheel is turned on the spot. It is known that the arrangement concerned requires great force and wears the wheel considerably. According to the second basic principle, the driving mechanism of the crane is used for turning the wheels, and in that case the wheel is offset from the turning centre and turns rolling.

To turn crane wheels by means of the drive mechanism is known, for instance, from publications FI 101957 B and JP 2001-213587 A and JP 2002-137887 A.

Publication FI 101957 B discloses a bogie wheel arrangement, in which one bogie comprises two wheels side by side, one of the wheels being a drive wheel and the other an idle wheel. Each bogie comprises a specific drive mechanism and consequently a specific turning mechanism.

Publications JP 2001-213587 A and JP 2002-137887 A disclose a bogie arrangement, in which there are two bogies, both having two wheels side by side. The drive mechanism is only arranged in one bogie, and for turning the bogies are interconnected with a turning rod or the like and a mechanism providing a turning motion, generally a hydraulic cylinder.

Now, it is desired that the corresponding turning principle be applied to an 8-wheel crane, for instance, in which one bogie comprises two tandem wheels. The arrangement concerned poses a problem, however, that in order to provide all three operating modes the position of the wheels in different modes is not viable or optimal. If the connecting bar between the wheels is cross-coupled on different sides of the turning centre of the wheels, the wheels can be turned in a transverse mode symmetrically at the bogie ends, whereby loading will be evenly distributed on both wheels. However, this does not allow a circling mode arrangement, because the wheels cannot be turned in the same direction. If the connecting rod is coupled on the same side of the turning centres, a circling mode will work, but in a transverse position the wheels are asymmetrical with respect to the bogie centre. For instance, the solution of the above-mentioned JP-publications does not provide any help in turning two tandem wheels placed asymmetrically with respect to the turning centre in the bogie, because in the arrangement of the JP publications the wheels of each bogie are placed symmetrically with respect to the turning centre, and thus the above-mentioned symmetry-related problem does not occur.

SUMMARY OF THE INVENTION

The object of the invention is to eliminate the above problems associated with turning a crane bogie provided with two tandem wheels by means of one drive mechanism. This is achieved with a crane in accordance with the invention, which is characterized in that a turning device arrangement comprises at least two turning rods connecting the wheels, which turning rods are connected to counterparts provided for each turning position or function in load-bearing structures of the wheels and turning along therewith, whereby at one wheel the position of the turning rods or the counterparts in the wheel's load-bearing structure is slidable around the load-bearing structure, yet the one of the counterparts or turning rods that corresponds to the selected turning position may be locked with a locking mechanism immobile with respect to the load-bearing structure for enabling wheel turning.

Typically, the crane is such that it comprises a frame structure whose lower part includes two parallel lower girders at the opposite ends thereof and that the bogie structures are arranged at both ends of either lower girder.

Preferably the turning rods are secured to fastenings in the vertical load-bearing structures of the wheels, which fastenings are able to slide or rotate at one wheel about the load-bearing structure thereof, yet the one of the fastenings that corresponds the selected turning position may be locked with a locking mechanism immobile to the vertical structure.

LIST OF DRAWINGS

Figure 2:
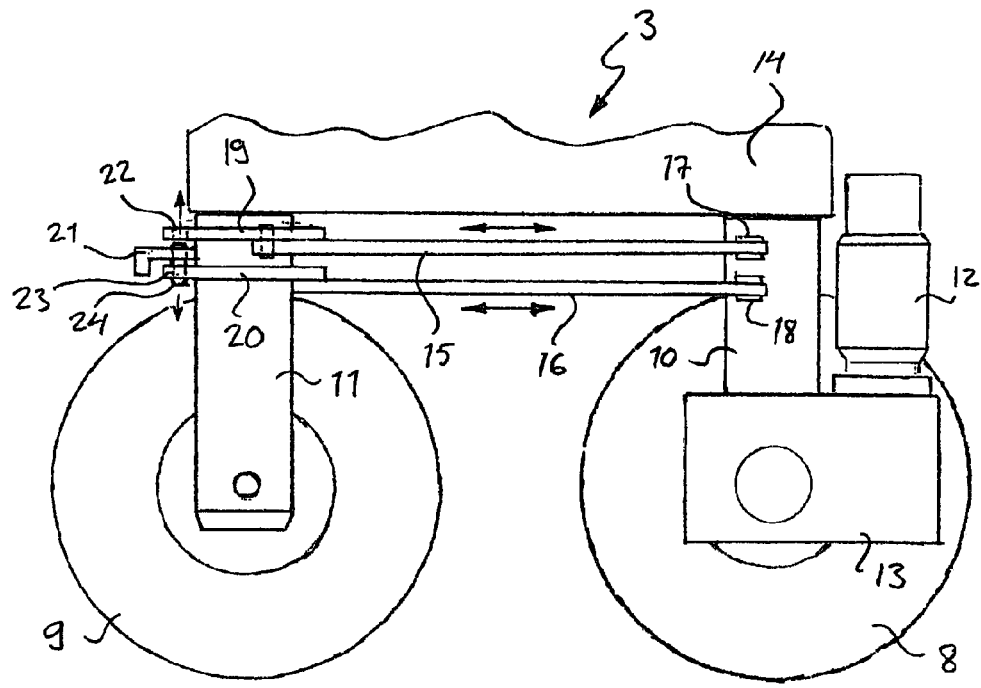
Figure 3:
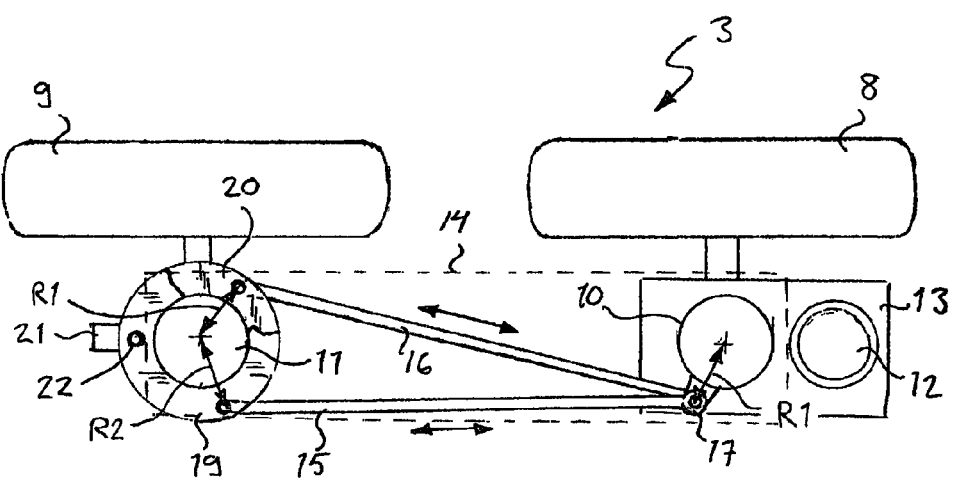
Figure 4:
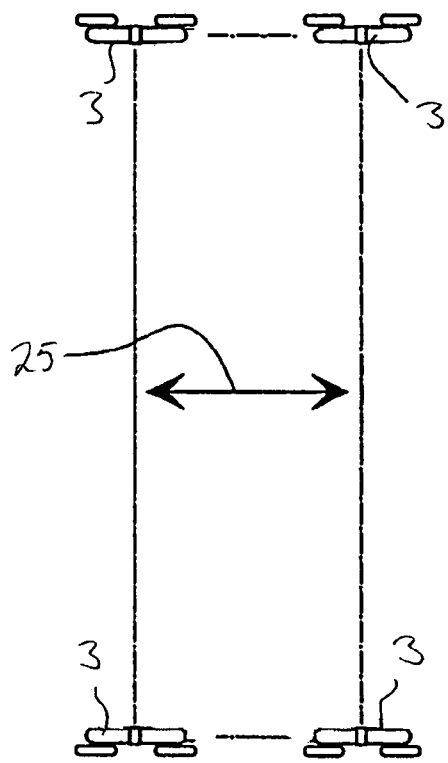
Figure 5:
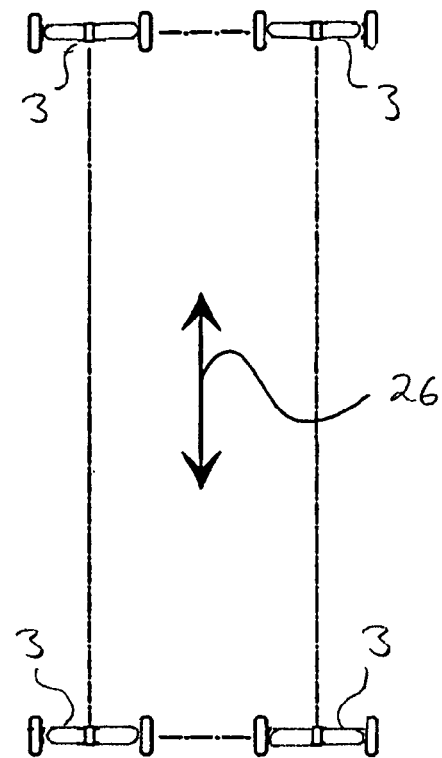
Figure 6:
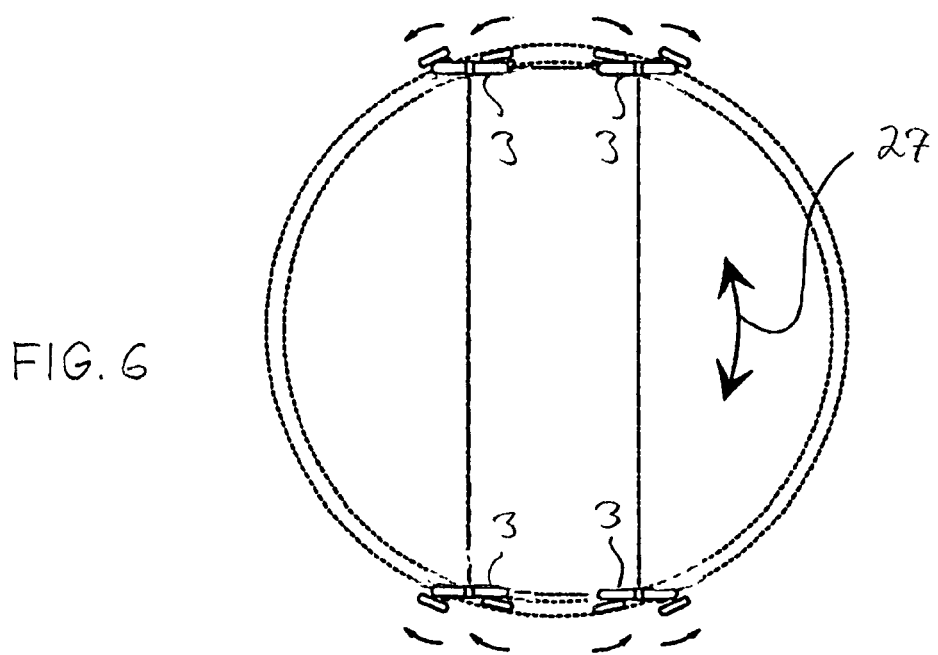

In the following, the invention will be described in greater detail by means of a preferred embodiment with reference to the attached drawings, in which FIG. 1 shows a crane seen obliquely from above, FIG. 2 is a side view of one bogie, FIG. 3 is a top view of the bogie of FIG. 2, FIG. 4 is a top view of the mutual position of the wheel pairs in the bogie as the crane is driven in lateral direction, FIG. 5 is a top view of the mutual position of the wheel pairs in the bogie as the crane is driven in longitudinal direction, and FIG. 6 is a top view of the mutual position of the wheel pairs in the bogie as the crane is driven in circle.

DETAILED DESCRIPTION OF THE INVENTION

With reference to FIG. 1, the crane comprises a frame structure 1 whose lower part includes two parallel lower girders 2 at the opposite ends thereof. Both ends of either lower girder 2 are provided with bogie structures 3, in this example four in total. The upper part of the frame structure 1 includes two upper girders 4, which are transverse to the lower girders 2 and along which a hoisting carriage 5 of the crane is arranged to move. A diesel generator 6 produces power for the crane via an electric power system 7.

The bogie structure 3 is shown in greater detail in FIGS. 2 and 3. Each bogie structure 3 includes two tandem wheels 8 and 9, which are mounted on a bearing at the lower ends of tubes 10 and 11 extending downwardly from the bogie structure 3, on the sides of these tubes. The wheels 8 and 9 are able to turn along with the tubes 10 and 11 about their vertical axes and in the above-described manner the wheels 10 and 11 are offset with respect to the vertical axes. One wheel 8 is a drive wheel and the other wheel 9 is an idle wheel. For the drive wheel 8 there is arranged an electric motor 12 that is coupled through a gear system 13 to the wheel 8. In action, the drive wheel 8 turns "automatically" about the vertical axis of the vertical tube 10 because of the above-described "asymmetrical" suspension, unless the turning is prevented by a suitable locking device. The locking may be, for instance a band brake known from Finnish patent 101957 and arranged between the vertical tube 10 and the bogie frame 14 of FIG. 2, or the locking may be arranged in an appropriate manner, for instance, between the bogie frame 14 and the electric motor 12 standing adjacent thereto. The locking is not, however, relevant to the invention, whereas "asymmetrical" suspension is, so that the electric motor 12 could also turn the wheel 8 when need be.

The basic idea of the invention is a turning device arrangement for turning the wheel pair 8 and 9 in cooperation to a selected position.

In this exemplary embodiment, the turning device arrangement comprises two turning rods 15 and 16 which connect wheels and which are coupled to fastenings 17, 18, 19, 20 that correspond to each turning position or function and are located in vertical tubes 10 and 11 of the wheels. The fastenings 17 and 18 are arranged in a fixed manner in the vertical tube 10 of the drive wheel 8 and the fastenings 19 and 20 are arranged to be slidable about the vertical tube 11 of the idle wheel 9, yet lockable to a point that corresponds to the selected turning position. The turning rod 15 is arranged lockable on the same side of the vertical tubes 10 and 11 to turn the wheels 8 and 9 in the same direction for circling of the crane, the turning rod 16 being arranged lockable on different sides of the vertical tubes 10 and 11 for turning the crane wheels 8 and 9 in the opposite directions to enable longitudinal drive of the crane.

The fastenings 19 and 20 are superposed plates arranged around the vertical tubes 10 and 11, and the mechanism for their locking comprises a protrusion 21 arranged in the vertical tube between these plates 19 and 20 and including a locking pin 24 that moves vertically therethrough and fits in holes 22 and 23 in the plates 19 and 20 in order to lock optionally one or other of the plates to the protrusion 21. Naturally the locking may also be arranged in any other suitable manner, for instance, by pressing the plates between friction surfaces (not shown in the figures). An unlocked plate may rotate freely about the vertical tube 11, and the turning rod coupled thereto will not then have a turning effect on the wheel 9.

It is advantageous that the turning rod 15 intended for circling mode is secured with a slightly different radius R2 from the radius R1 connecting the vertical axis of the vertical tube 11 and the vertical tube 10 of the drive wheel 8.

FIGS. 4 to 6 show different drive modes of the crane. In accordance with FIG. 4, in lateral drive both wheels 8 and 9 of each bogie 3 are locked in parallel with the bogie frame 14 (and at the same time with the lower girders 2), whereby the crane moves straight in the direction indicated by arrow 25. If the driving direction is to be changed, one or other of the turning rods 15 or 16 is locked into place in the vertical tube 11 of the idle wheel 9 and the locking of the drive wheel 8 in the vertical tube 10 is released, and as the wheels 8 and 9 of the bogies 3 move they start turning in directions determined by the selected turning rod 15 or 16 due to the drive mechanisms, in other words, the operation of the electric motors 12 and the asymmetrical suspension of the wheels 8 and 9.

In the drive mode of FIG. 5, the turning rods 16 are locked, and while moving the wheels 8 and 9 of all bogies 3 will turn in the opposite directions at the ends of the bogies 3, perpendicularly to the bogie frames 14, whereby the crane may be driven in longitudinal direction indicated by arrow 26, when the wheels 8 and 9, after turning them, will be locked in this position.

In the drive mode of FIG. 6, the turning rods 15 are locked, and while moving the wheels 8 and 9 of the bogie 3 will turn in the same direction. In order to enable circling drive shown in the figure (indicated by arrow 27), the wheel pairs of bogies of the same lower girder 2 are turned in different directions, i.e. in the figure the wheel pair of the upper left bogie is turned anticlockwise and the wheel pair of the upper right bogie is turned clockwise. The lower wheel pairs are turned vice versa, respectively. In addition, the wheels 8 and 9 may be turned at different angles tangentially to the turning circle, in accordance with the crane dimensions, by making the above-mentioned radii R1 and R2 different in length. In diagonal drive all wheels are turned in the same, desired driving direction.

It is obvious to a person skilled in the art that various applications of the invention are not limited to the above example alone, but they may vary within the scope of the accompanying claims. For instance, the turning rods may be arranged in fastenings in the vertical tubes of the wheels, the fastenings being slide tracks which are arranged at one wheel about the vertical tube thereof and in which the turning rods may slide, yet in which the turning rod, corresponding to the selected turning position, may be locked for wheel turning with a suitable locking mechanism to be immobile with respect to the vertical tube. Alternatively, the turning wheel lockings, by which different turning positions are selected, may also be located in the drive wheels.

The invention claimed is:

1. A crane comprising:
   bogie structures in the corners of the crane,
   two wheels arranged in tandem in each bogie structure, each of the wheels being arranged in the bogie structure to be turnable about its own vertical axis, and being offset from its own vertical axis, and one wheel being a drive wheel and another being an idle wheel,
   a mechanism that drives and turns each drive wheel, and
   a turning device arrangement provided between each wheel pair for turning the wheel pair in co-operation to a selected position,
   wherein the turning device arrangement comprises at least two turning rods connecting the wheels, which turning rods are connected to counterparts provided for each turning position in load-bearing structures of the wheels and turning along therewith, wherein one of the turning rods is arranged to turn the wheels in the same direction and another of the turning rods is arranged to turn the wheels in opposite directions, whereby at one wheel the position of one of the turning rods and the counterparts in the wheel's load-bearing structure is slidable around the load-bearing structure, yet the one of the counterparts and turning rods that corresponds to the selected turning position may be locked with a locking mechanism immobile with respect to the load-bearing structure for enabling wheel turning, wherein the turning rods are secured to fastenings in the load-bearing structures of the wheels, which fastenings are able to slide or rotate at one wheel about the load-bearing structure thereof, yet the one of the fastenings that corresponds to the selected turning position may be locked with a locking mechanism immobile to the load-bearing structure for enabling wheel turning.

2. The crane of claim 1, wherein the crane comprises a frame structure whose lower part includes two parallel lower girders at the opposite ends thereof and that the bogie structures are arranged at both ends of either lower girder.

3. The crane of claim 1, wherein the lockable fastenings are plates arranged in superposition around the load-bearing structures and that the locking mechanism comprises a protrusion arranged in the load-bearing structure between the plates and including a locking pin that moves vertically therethrough and fits in holes in the plates, for locking optionally one or other of the plates to the protrusion.

4. The crane of claim 1, wherein the turning rod lockings, which allow selection of different turning positions, are implemented in idle wheels.

5. The crane of claim 1, wherein the turning rod lockings, which allow selection of different turning positions, are implemented in drive wheels.

* * * * *